US008737210B2

(12) United States Patent
Tremblay et al.

(10) Patent No.: US 8,737,210 B2
(45) Date of Patent: May 27, 2014

(54) LOAD BALANCING SCTP ASSOCIATIONS USING VTAG MEDIATION

(75) Inventors: Richard Tremblay, Rosemere (CA); Abdallah Chatilla, Montreal (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 568 days.

(21) Appl. No.: 13/044,128

(22) Filed: Mar. 9, 2011

(65) Prior Publication Data

US 2012/0230187 A1    Sep. 13, 2012

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04J 3/16 | (2006.01) | |
| H04J 3/22 | (2006.01) | |

(52) U.S. Cl.
USPC ........................................ 370/230; 370/466

(58) Field of Classification Search
None
See application file for complete search history.

(56) References Cited

U.S. PATENT DOCUMENTS

| | | | |
|---|---|---|---|
| 6,917,626 B1 * | 7/2005 | Duvvury | 370/466 |
| 2004/0197079 A1 * | 10/2004 | Latvala et al. | 386/46 |
| 2007/0091902 A1 | 4/2007 | Stewart et al. | |
| 2008/0101357 A1 * | 5/2008 | Iovanna et al. | 370/389 |
| 2009/0265467 A1 * | 10/2009 | Peles | 709/226 |

FOREIGN PATENT DOCUMENTS

| | | |
|---|---|---|
| WO | 03/041355 A1 | 5/2003 |
| WO | 2009/129835 A1 | 10/2009 |

OTHER PUBLICATIONS

International Search Report for PCT/IB2012/051096 with mailing date of Jun. 12, 2012; 4 pages.

* cited by examiner

*Primary Examiner* — Derrick Ferris
*Assistant Examiner* — Kodzovi Acolatse
(74) *Attorney, Agent, or Firm* — Ericsson Canada Inc.; Alex Nicolaescu

(57) ABSTRACT

Presented is a system and methods for routing Stream Control Transmission Protocol (SCTP) between a client and a back-end server by a front-end server operating transparently between the client and the back-end server. The front-end server uses a distribution key created by the front-end server to route the SCTP packets to the proper destination. The distribution key is comprised of a client SCTP port number, a back-end server SCTP port number and a back-end server Initiate-Tag. The front-end server arbitrates clashes between distribution keys of different back-end servers by replacing the back-end server generated SCTP Initiate-Tag with a front-end server generated SCTP Initiate-Tag.

18 Claims, 8 Drawing Sheets

LOAD BALANCING SCTP ASSOCIATIONS USING VTAG MEDIATION

TECHNICAL FIELD

The present invention relates generally to load balancing a series of servers and more specifically to load balancing a series of servers based on a verification tag associated with a Stream Control Transport Protocol (SCTP).

BACKGROUND

As the popularity of the internet and the functionality of websites continue to grow, many websites require multiple servers to handle the load of communications traffic directed toward their pages. In another use of the internet, Voice over Internet Protocol service has grown to a volume where many servers are required to handle the demand for a given service provider. As the requirement for multi-server systems evolves, a need arises for the ability to balance the load generated for the service across the number of deployed servers providing the service.

Further, the desire to handle the signaling of telecommunications over Internet Protocol (IP) and the growth in complexity of websites with regard to providing a rich multimedia experience combined with reliable and responsive communications has led to the development of communication protocols such as Stream Control Transmission Protocol (SCTP). SCTP provides a connection-oriented protocol, similar to Transmission Control Protocol (TCP), on top of the connectionless IP and includes the additional features of multi-homing and multi-streaming that are not available with TCP. These additional features allow a more efficient communication between a multitude of clients and servers.

A load-balancing system for multiple servers is desired that provides the features of SCTP but with one or more of: 1) no modifications to the SCTP protocol; 2) minimize the amount of SCTP chunk inspection; 3) minimize association state storing; 4) minimize SCTP checksum recalculation; 5) no modifications to the IP header; 6) support the SCTP multi-homing feature; 7) transparent to users of the socket Application Programming Interface (API); and 8) no modifications to the server IP communications stack. A number of attempts, based on a Network Address Translation (NAT) scheme, to provide a solution have been attempted but these solutions typically do not meet some or all of the characteristics specified above.

Consequently, market pressure is building for a load-balancing capable system which would meet the characteristics specified above and would also allow, among other things, the ability to scale the system capacity as required without interference with the currently operating servers or the applications and associations running on the operating servers.

SUMMARY

Systems and methods address the market needs described above by providing an intermediate front-end server to route SCTP communications between clients requesting a service and back-end servers providing the service. The front-end server and a series of back-end servers share a Virtual Internet Protocol (VIP) address and SCTP port numbers allowing the clients to access the service without knowledge of the specific back-end server providing the service. In fact, according to an embodiment the back-end servers operate independently and are not aware that other back-end servers exist or that a front-end server is acting as an intermediary. In a similar fashion, the client is unaware of the presence of the front-end server and believes the SCTP communication interaction is directly with the back-end server.

In one exemplary embodiment, a method is illustrated for providing SCTP communication traffic distribution based on SCTP verification tags. In a first exemplary embodiment step, a request is received at a front-end server to initiate an SCTP association between a client and a back-end server. In the next exemplary embodiment step, the front-end server generates a distribution key, if clashing Verification-Tags are detected, for mediating SCTP communication packets between the client and the back-end server. In the next exemplary embodiment step, the front-end server transparently routes SCTP packets between the client and the back-end server.

In another exemplary embodiment, a system for providing a transparent intermediary SCTP communication routing front-end server is presented. The exemplary system embodiment includes the following components. The first exemplary system embodiment component is an initialization component for establishing an SCTP association between a client and a back-end server and creating a distribution key for the SCTP association based on SCTP information provided by the client and the back-end server. The next exemplary system embodiment component is an engine component for routing the SCTP communication traffic between the client and the back-end server based on the SCTP distribution key. Continuing, the next exemplary system embodiment component is a storage component for storing data associated with routing the SCTP communications between the client and the back-end server.

Further, in another exemplary embodiment, if a clash develops between the distribution key created for one SCTP association and the distribution key created for another SCTP association managed by the front-end server, then the front-end server generates a new distribution key by replacing a portion of the information provided by the back-end server with information provided by the front-end server. Continuing with the exemplary embodiment, the front-end server then manages this matched pair of distribution keys for the clashing distribution key association in verification tag translation table.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
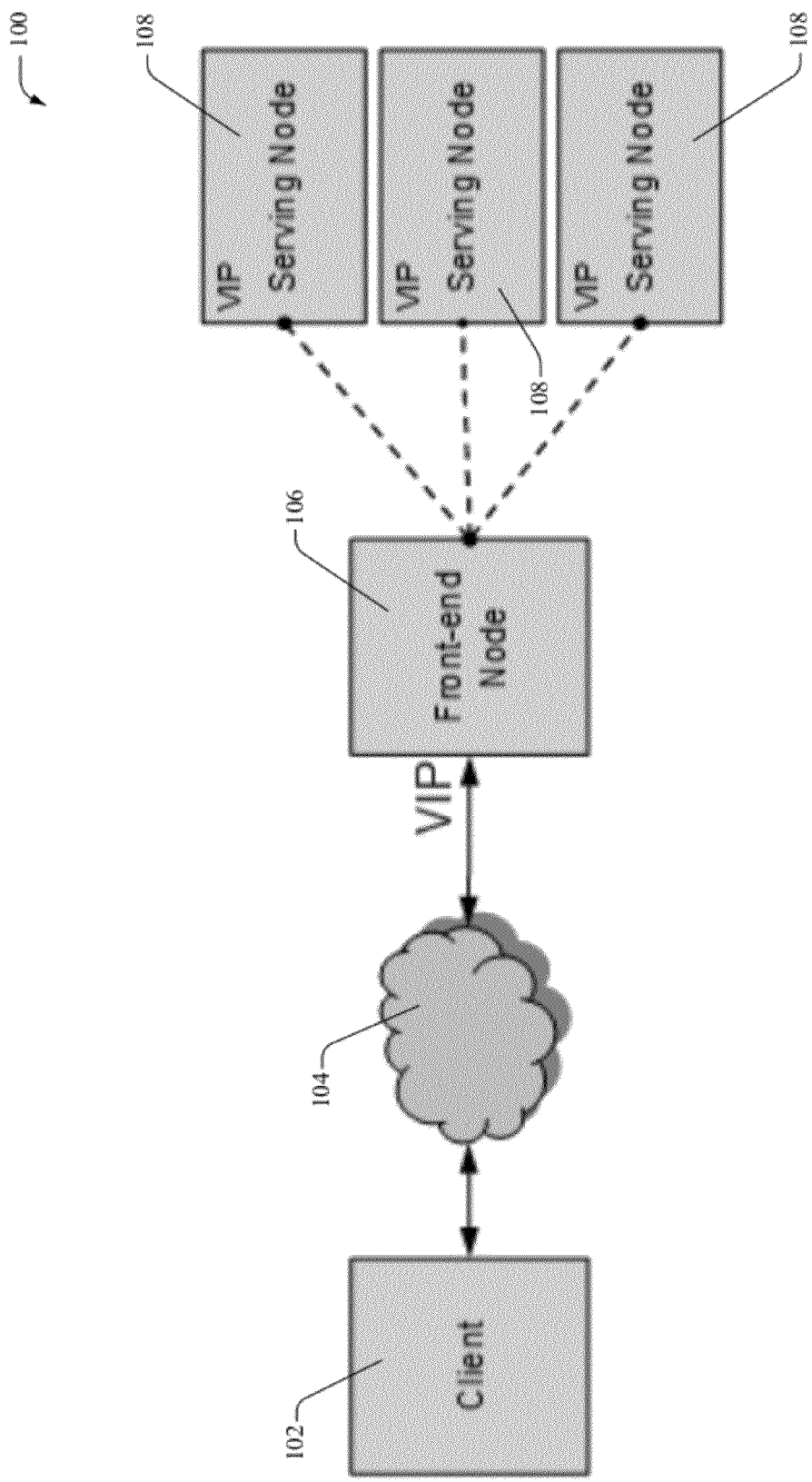
FIG. 1 depicts a system for a load-balancing front-end node to establish and route an SCTP connection between a client and a back-end serving node based on a back-end serving node generated SCTP verification tag.

Looking first to FIG. 1, a diagram of an exemplary embodiment of a load-balancing SCTP association system 100 for providing communication distribution based on verification tag mediation is illustrated. The exemplary embodiment of the load-balancing SCTP association system 100 includes but is not limited to an exemplary client 102, an exemplary network 104, an exemplary front-end node 106 and three exemplary back-end servers 108. It should be noted in this exemplary embodiment that the back-end servers 108 can be any number of back-end servers 108 operating independently.

In one aspect of the exemplary embodiment, the client 102 is any device capable of requesting a service from a front-end server 106 communicatively connected to the client 102 across a network 104. In one example of the exemplary embodiment the client 102 includes but is not limited to a personal computer running a web browser and accessing a web page located at a website on the internet. In another aspect of the exemplary embodiment, the client 102 is configured to communicate to the front-end server 106 with the Stream Control Transport Protocol (SCTP) for connection-oriented support. Further in the exemplary embodiment, the client 102 is a telephone connected to a Voice over Internet Protocol (VoIP) device to communicate across a network 104 such as the internet to a front-end server for voice communications.

In another aspect of the exemplary embodiment, the network 104 provides a communications link between the client 102 and the front-end server 106. In one configuration of the exemplary embodiment, the network 104 can be the internet. Continuing with the exemplary embodiment, a front-end node 106 provides the capability to transparently route communications between a client 102 and one of a series of back-end servers 108 by using the SCTP verification tag as a distribution key. In a further aspect of the exemplary embodiment, the series of back-end servers 108 provide the application services desired by the client 102. It should be noted that although a single client 102 is illustrated, a plurality of clients 102 can be connected to the series of back-end servers 108. In a further aspect of the exemplary embodiment, the back-end servers 108 are unaware of each other and operate independently with their connected clients 102. It should also be noted that the back-end servers 108 and the client(s) 102 are unaware of the front-end server 106, the front-end server is transparent to the connection between the client(s) 102 and the back-end servers 108 and routes communications between the client(s) 102 and the back-end servers 108 based on the SCTP verification tags created by the back-end server 108 for the SCTP association.

Figure 2:
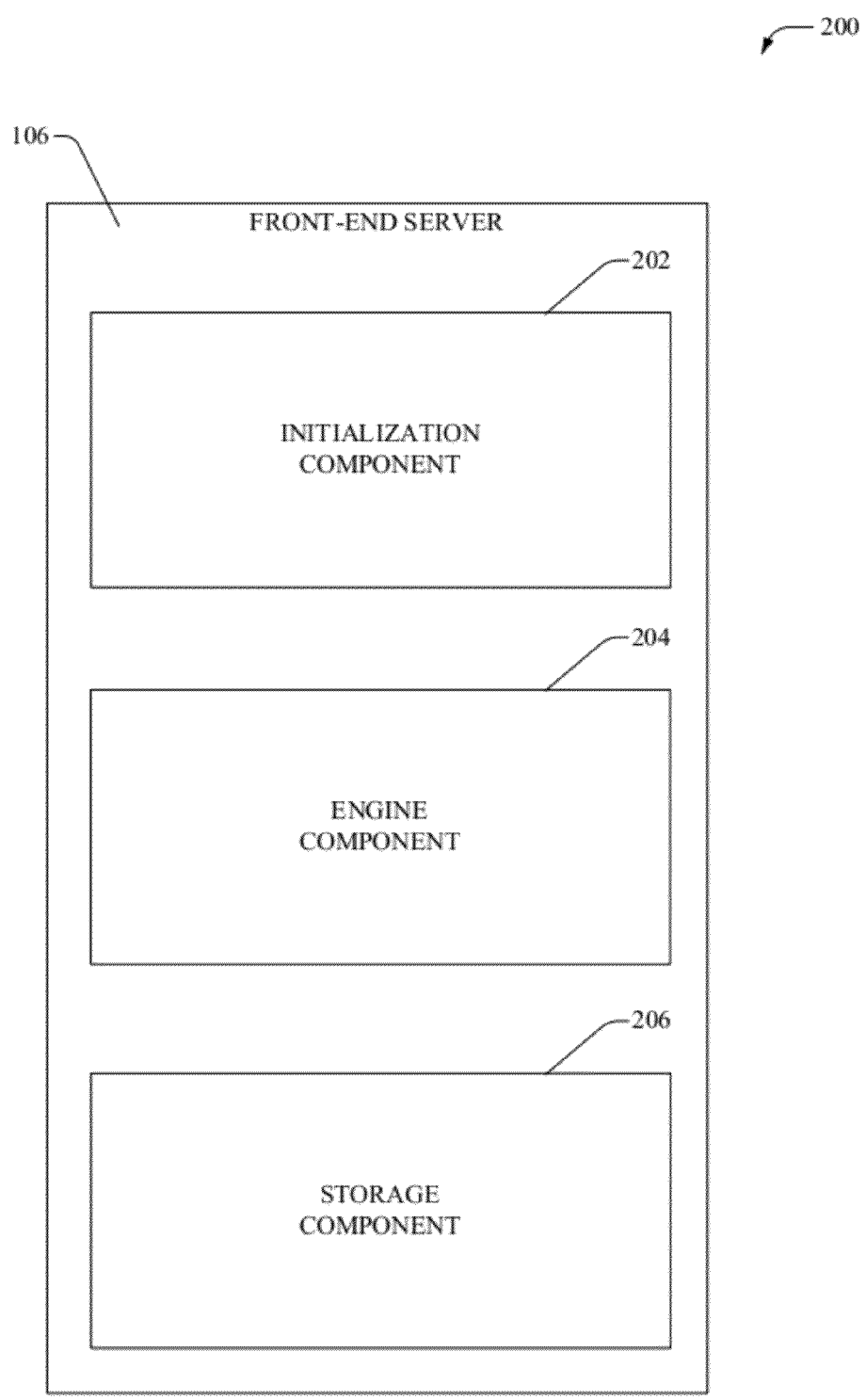
FIG. 2 depicts a front-end server for establishing and directing a connection between a client and a back-end serving node based on a back-end serving node generated SCTP verification tag wherein the front-end server is facilitated by an initialization component, an engine component and a storage component.

Looking now to FIG. 2, another exemplary embodiment 200 is depicted as a portion of exemplary embodiment 100. Exemplary embodiment 200 depicts a front-end server 106 including an initialization component 202, an engine component 204 and a storage component 206. In one aspect of the exemplary embodiment 200 the initialization component 202 can provide the capability to facilitate the creation of a non-clashing SCTP connection from either a client 102 or a back-end server 108.

In another aspect of the exemplary embodiment 200, the initialization component 202 can generate a distribution key based on a combination of the client 102 provided SCTP port number, the back-end server 108 provided SCTP port number and the back-end server 108 provided SCTP Initiate-Tag. Continuing with the exemplary embodiment, the front-end server 106 uses the distribution key to route communications between a client 102 and a back-end server 108 and guaranty that all communications received at the front-end server 106 are delivered to the appropriate end-point.

In another aspect of the exemplary embodiment 200, the initialization component 202 creates and maintains a verification tag translation table to prevent any clash between distribution keys. In this exemplary embodiment, a clash would develop if two client 102/back-end server 108 pairs provided port numbers and an Initiate-Tag that combined to form identical distribution tags. Continuing with the exemplary embodiment, as the front-end server 106 is initiating an SCTP association between a client 102 and a back-end server 108 the front-end server creates the distribution key based on the client 102/back-end server 108 port numbers and the Initiate-Tag provided by the back-end server 108. Next in the exemplary embodiment, the front-end server 106 looks in the verification tag translation table for an identical distribution key and if none is found then the SCTP association as initialized can continue with the front-end server 106 correctly routing communications between the client 102 and the back-end server 108 based on the distribution key.

Further in the exemplary embodiment, if the front-end server 106 finds a match of the distribution key in the verification tag translation table then the front-end server 106 generates a new Initiate-Tag value and creates a new non-conflicting distribution key. Next in the exemplary embodiment, the front-end server 106 creates a new entry in the verification tag translation table to hold the distribution key pair and the association initialization continues with the front-end server 106 correctly routing communications between the client 102 and the back-end server 108 based on the distribution key pair maintained in the verification tag translation table by the front-end server 106.

In another aspect of the exemplary embodiment, the engine component 204 provides the ability to distribute communications between a client 102 and a back-end server 108 after completion of the SCTP association initialization. In one aspect of the exemplary environment, the front-end server 106 receives a SCTP communication from a client 102 directed to one of the back-end servers 108 sharing a virtual internet protocol (VIP) address with the front-end server 106. Continuing with the exemplary embodiment, the engine component 204 of the front-end server 106 attempts to find the distribution key of the SCTP communication in the verification tag translation table and if the distribution key is not found in the verification tag translation table then the engine component 204 of the front-end server 106 forwards the SCTP communication to the back-end server 108 specified by the distribution key. Further in the exemplary embodiment, if the distribution key is found in the verification tag translation table then the engine component 204 of the front-end server 106 substitutes the distribution key in the communication with the associated distribution key in the verification tag translation table and recalculates the checksum, if required, for the communication and forwards the communication to the back-end server 108 specified by the replacement distribution key.

Continuing with another aspect of the exemplary embodiment, a storage component 206 provides the ability to store data associated with maintaining SCTP associations between a client 102 and a back-end server 108. Further in the exemplary environment, the storage component 206 comprises a verification tag translation table and a count of the number of entries in the verification tag translation table. The verification tag translation table counter in the exemplary environment storage component 206 can be used to determine if there is any need to inspect the verification tag translation table, as long as the count is zero, there have not been any clashes in distribution key generation and the communications from any clients 102 to any back-end servers 108 can be forwarded without a search of the verification tag translation table.

Figure 3:
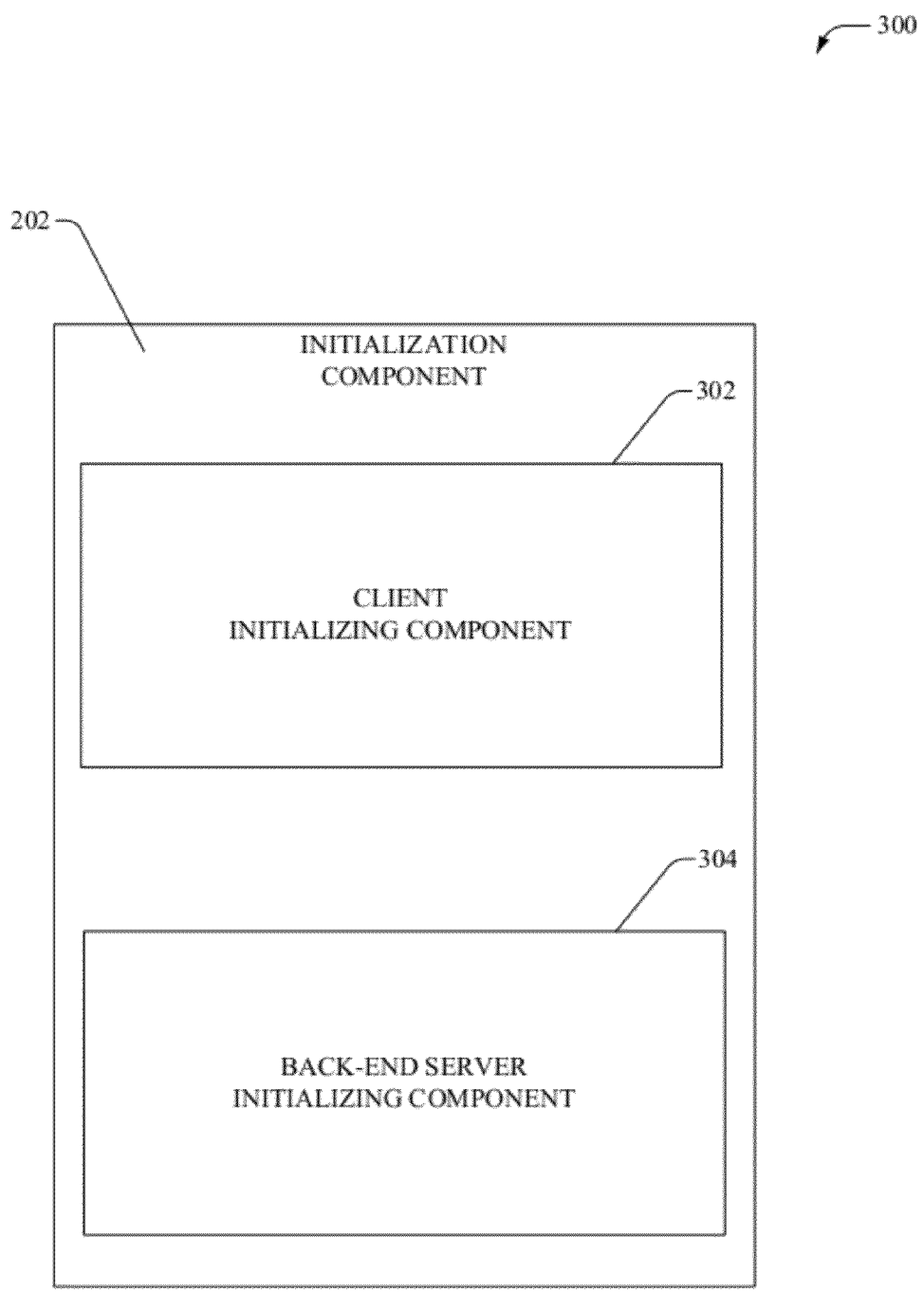
FIG. 3 depicts an initialization component of a front-end component of a system for a load-balancing front-end node to establish and direct a connection between a client and a back-end serving node based on a back-end serving node generated SCTP verification tag wherein the initialization component is facilitated by a client initializing component and a back-end server initializing component.

Turning now to FIG. 3, another exemplary embodiment 300 is depicted. A portion of the exemplary embodiment 300 depicts a client initialization component 302 and a back-end server initialization component 304. In one aspect of the exemplary embodiment 300, the client initialization component 302 provides the capability to manage an SCTP association initiated by a client 102. In the exemplary embodiment, the client initializing component 302 determines if the Initiate-Tag provided by the back-end server 108 would create a clashing distribution key with another SCTP association. Continuing with the exemplary embodiment, if a clashing distribution key is detected then the client initializing component 302 would replace the Initiate-Tag generated by the back-end server 108 with a non-clashing Initiate-Tag generated by the client initializing component 302, place the non-clashing Initiate-Tag in the INIT-ACK chunk and recalculate and replace the checksum in the SCTP common header.

Continuing with the exemplary embodiment, the back-end server initializing component provides the capability to manage an SCTP association initiated by a back-end server 108. In the exemplary embodiment, the back-end server initializing component 304 determines if the Initiate-Tag provided by the back-end server 108 would create a clashing distribution key with another SCTP association. Continuing with the exemplary embodiment, if a clashing distribution key is detected then the back-end server initializing component 304 would replace the Initiate-Tag generated by the back-end server 108 with a non-clashing Initiate-Tag generated by the back-end server initializing component 304, place the non-clashing Initiate-Tag in the INIT chunk and recalculate and replace the checksum in the SCTP common header.

Figure 4:
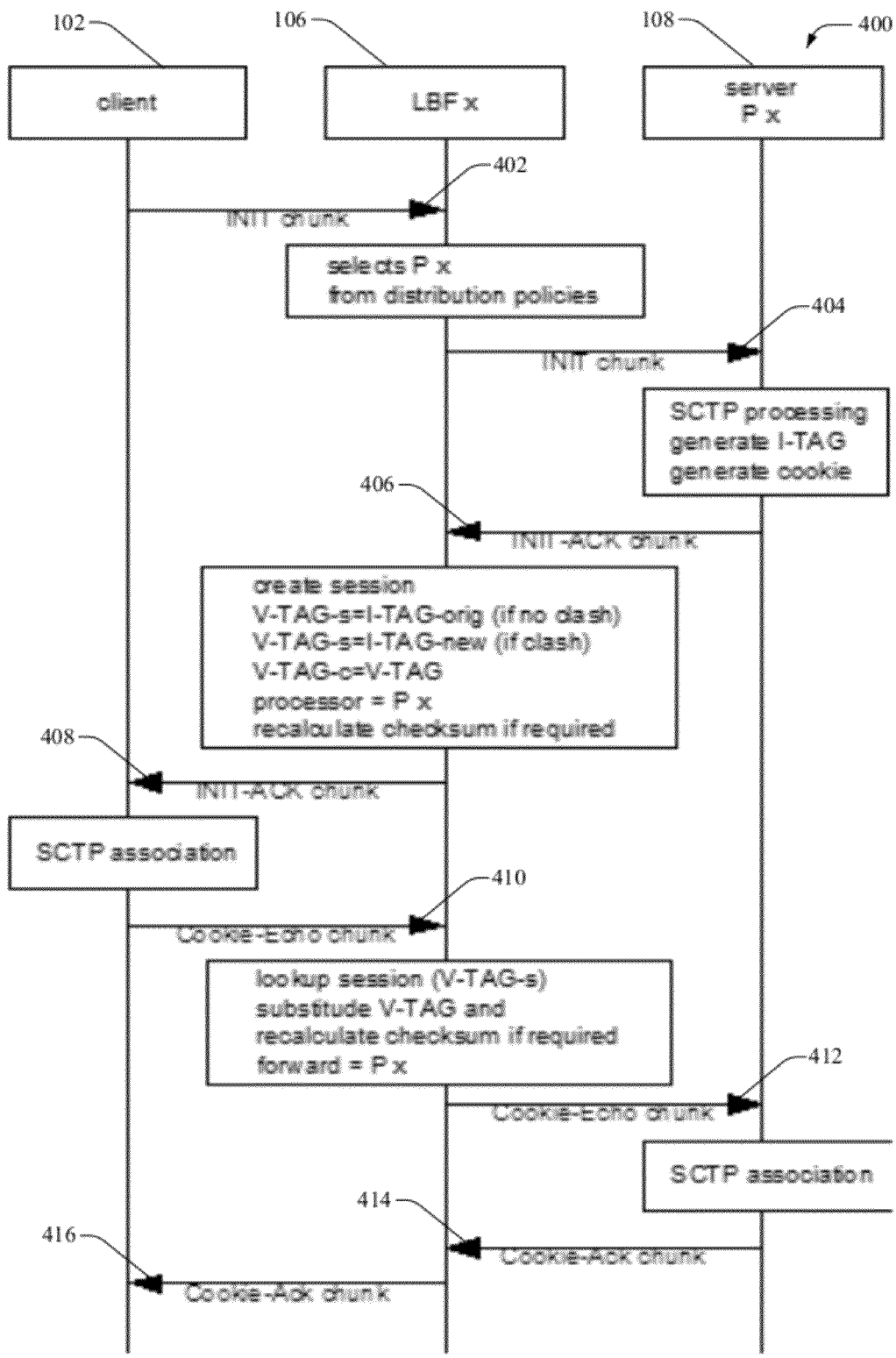
FIG. 4 is a flowchart depicting an SCTP association requests and responses between a client and a back-end server through a load-balancing front-end server with the client initiating the communication.

Turning now to FIG. 4, illustrated is an exemplary embodiment 400. The exemplary embodiment 400 depicts the signaling flow for a client 102 initiating an SCTP association with a back-end server 108 through a front-end server 106. It should be noted in the exemplary embodiment that the front-end server 106 and one or more back-end servers 108 share a virtual internet protocol (IP) address and the back-end servers 108 operate independently of each other. It should be further noted in the exemplary embodiment that the operation of the front-end server 106 is transparent to both the client 102 and the back-end server 108 involved in the SCTP association.

First, at exemplary embodiment step 402, the client 102 sends an SCTP INIT chunk towards the virtual IP address shared by the front-end server 106 and the series of back-end servers 108. In the exemplary embodiment, the front-end server 106 receives the SCTP INIT chunk and makes a determination based on distribution policies which back-end server 108 will receive the SCTP INIT chunk. Continuing at step 404 with the exemplary embodiment, the front-end server 106 forwards the SCTP INIT chunk to the selected back-end server 108. Continuing with the exemplary embodiment, the back-end server 108 processes the SCTP INIT chunk by generating an SCTP INIT-ACK chunk including an Initiate-Tag and the SCTP port number used by the back-end server 108 and at 406, sends the INIT-ACK chunk towards the client 102.

In the exemplary embodiment, the front-end server 106 receives the SCTP INIT-ACK chunk and inspects the contents of the INIT-ACK chunk to create a distribution key to manage the communications between the initiating client 102 and the selected back-end server 108. The exemplary embodiment continues with the front-end server 106 combining the client 102 SCTP port number with the Initiate-Tag and the back-end server 108 SCTP port number to create a distribution key for the SCTP association. Continuing with the exemplary embodiment, the front-end server 106 checks the verification tag translation table to confirm that the newly created distribution key is not already in use by another SCTP association managed by the front-end server 106. In the exemplary embodiment, if the distribution key is found in the verification tag translation table then the front-end server 106 generates a new Initiate-Tag and creates a non-clashing distribution key.

Next in the exemplary embodiment, the front-end server creates a new entry in the verification tag translation table for the client 102 and back-end server 108 generated Initiate-Tags and stores the values in the verification tag translation table. Continuing with the exemplary embodiment, the front-end server 106 updates the SCTP INIT-ACK chunk with the new Initiate-Tag and a recalculated checksum and, at step 408, forwards the updated SCTP INIT-ACK chunk to the client 102. It should be noted in the exemplary embodiment that if the front-end server 106 does not detect a clash of distribution keys then the front-end server 106 does not create an entry in the verification tag translation table for the SCTP association.

Continuing at step 410 of the exemplary environment, the client 102 sends a COOKIE-ECHO chunk towards the back-end server 108 and the intermediate front-end server 106 inspects the COOKIE-ECHO chunk to determine if the distribution key is a match with any of the distribution keys stored in the verification tag translation table. In the exemplary embodiment, if the distribution key matches an entry of the verification tag translation table then the front-end server 106 replaces the Verification-Tag in the COOKIE-ECHO chunk with the Initiate tag from the verification tag translation table, replaces the checksum with a checksum recalculated based on the replaced Verification-Tag and, at step 412, forwards the COOKIE-ECHO chunk to the back-end server 108. Next in the exemplary embodiment at 414, the back-end server 108 sends a COOKIE-ACK chunk towards the client 102 and at step 416 the front-end server 106 transparently forwards the COOKIE-ACK chunk towards the client 102.

Figure 5:
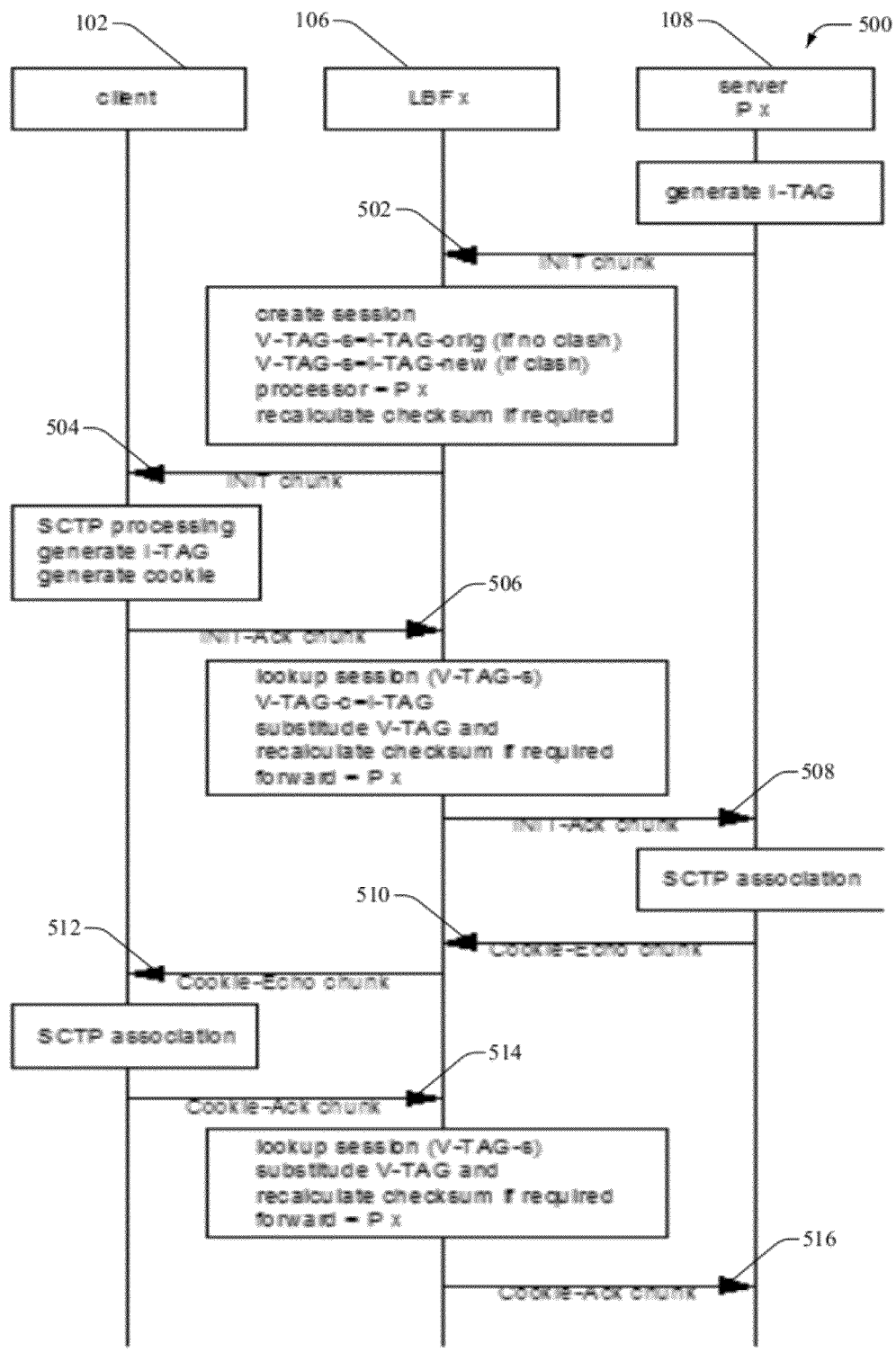
FIG. 5 is a flowchart depicting an SCTP association requests and responses between a client and a back-end server through a load-balancing front-end server with the back-end server initiating the communication.

Turning now to FIG. 5, illustrated is an exemplary embodiment 500. The exemplary embodiment 500 depicts the signaling flow for a back-end server 108 initiating an SCTP association with a client 102 through a front-end server 106. It should be noted in the exemplary embodiment that the front-end server 106 and one or more back-end servers 108 share a virtual internet protocol (IP) address and the back-end servers 108 operate independently of each other. It should be further noted in the exemplary embodiment that the operation of the front-end server 106 is transparent to both the client 102 and the back-end server 108 involved in the SCTP association.

First, in the exemplary embodiment, the back-end server 108 generates an Initiate-Tag and sends the Initiate-Tag, at step 502, in an SCTP INIT chunk towards the client 102 transparently through the front-end server 106. Next in the exemplary embodiment, the front-end server 106 receives the SCTP INIT chunk from the back-end server 108 and transparently inspects the contents of the INIT chunk to create a distribution key to manage the communications between the destination client 102 and the initiating back-end server 108. The exemplary embodiment continues with the front-end server 106 combining the client SCTP port number with the back-end server 108 generated Initiate-Tag and the back-end server 108 SCTP port number to create a distribution key for the SCTP association.

Continuing with the exemplary embodiment, the front-end server 106 checks the verification tag translation table to confirm that the newly created distribution key is not already in use by another SCTP association managed by the front-end server 106. In the exemplary embodiment, if the distribution key is found in the verification tag translation table then the front-end server 106 generates a new Initiate-Tag to replace the back-end server 108 generated Initiate-Tag and creates a non-clashing distribution key. Next in the exemplary embodiment, the front-end server creates a new entry in the verification tag translation table for the client 102 and back-end server 108 generated Initiate-Tag and SCTP port numbers and stores the values in the verification tag translation table.

Continuing at step 504 with the exemplary embodiment, the front-end server 106 forwards the SCTP INIT chunk to the client 102 and the client 102 processes the SCTP INIT chunk by generating an SCTP INIT-ACK chunk including a client generated Initiate-Tag and a cookie associated with the client and, at step 506, sends the INIT-ACK chunk towards the back-end server 108 through the front-end server 106.

Next in the exemplary embodiment, the front-end server 106 receives the SCTP INIT-ACK chunk from the client 102 and transparently inspects the contents of the SCTP packet common header to retrieve the distribution key used to distribute the SCTP INIT-ACK to the appropriate back-end server 108. Continuing with the exemplary embodiment, the front-end server 106 checks the verification tag translation table to determine if the distribution key is in the verification tag translation table. In the exemplary embodiment, if the distribution key is found in the verification tag translation table then the front-end server 106 replaces the Verification-Tag in the SCTP common header of the INIT-ACK message with the associated back-end server 108 Initiate-Tag from the verification tag translation table and updates the checksum before forwarding the SCTP INIT-ACK to the appropriate back-end server 108 at step 508. It should be noted in the exemplary embodiment that if the front-end server 106 does not detect a clash of distribution keys then the front-end server 106 simply forwards the SCTP INIT-ACK to the appropriate back-end server 108 based on the Verification-Tag retrieved from the SCTP common header and the back-end server establishes an SCTP association with the client.

Continuing at step 510 of the exemplary environment, the back-end server 108 sends a COOKIE-ECHO chunk towards the client 102 through the front-end server 106 and the front-end server 106 transparently forwards, at step 512, the COOKIE-ECHO to the client 102 and the client establishes an SCTP association with the back-end server 108. Next in the exemplary embodiment at 514, the client 102 sends a COOKIE-ACK chunk towards the back-end server 108 and at step 516 the front-end server 106 determines if a distribution key exists for this SCTP association and accordingly if an exchange of Verification-Tags is required. The exemplary embodiment continues with the front-end server 106 transparently, with regard to the client 102 and the back-end server 108, forwarding the COOKIE-ACK chunk towards the back-end server 108.

Figure 6:
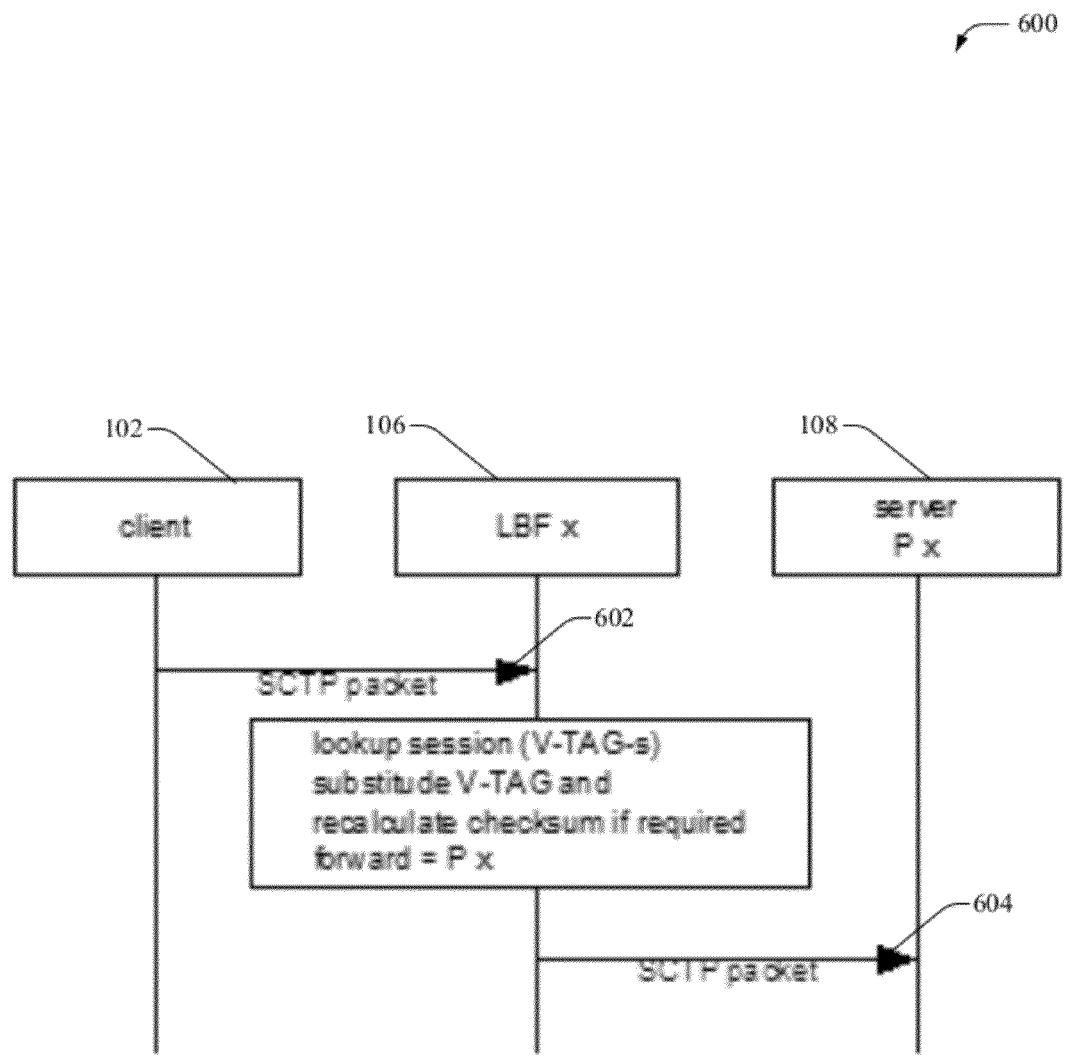
FIG. 6 is a flowchart depicting after SCTP association communications from a client to a back-end server through a load-balancing front-end server.

Turning now to FIG. 6, illustrated is an exemplary embodiment 600. The exemplary embodiment 600 depicts the signaling flow for a client 102 communicating through a front-end server 106 to a back-end server 108 using an established SCTP association. It should be noted in the exemplary embodiment that the front-end server 106 and one or more back-end servers 108 share a virtual internet protocol (IP) address and the back-end servers 108 operate independently of each other. It should be further noted in the exemplary embodiment that the operation of the front-end server 106 is transparent to both the client 102 and the back-end server 108 involved in the SCTP association.

Next in the exemplary embodiment, a client 102 sends, at step 602, an SCTP packet through the front end server 106 towards a back-end server 108. The front-end server 106 receives the SCTP packet from the client 102 and transparently inspects the contents of the SCTP packet to retrieve the distribution key used to distribute the SCTP packet to the appropriate back-end server 108. Continuing with the exemplary embodiment, the front-end server 106 checks the verification tag translation table to determine if the distribution key is in the verification tag translation table. In the exemplary embodiment, if the distribution key is found in the verification tag translation table then the front-end server 106 replaces the Verification-Tag in the SCTP packet common header with the associated back-end server 108 Initiate-Tag from the verification tag translation table and updates the checksum before forwarding the SCTP packet to the appropriate back-end server 108 at step 604. It should be noted in the exemplary embodiment that if the front-end server 106 does not detect a clash of distribution keys then the front-end server 106 forwards the SCTP packet to the appropriate back-end server 108 based on the Verification-Tag retrieved from the SCTP packet common header.

Figure 7:
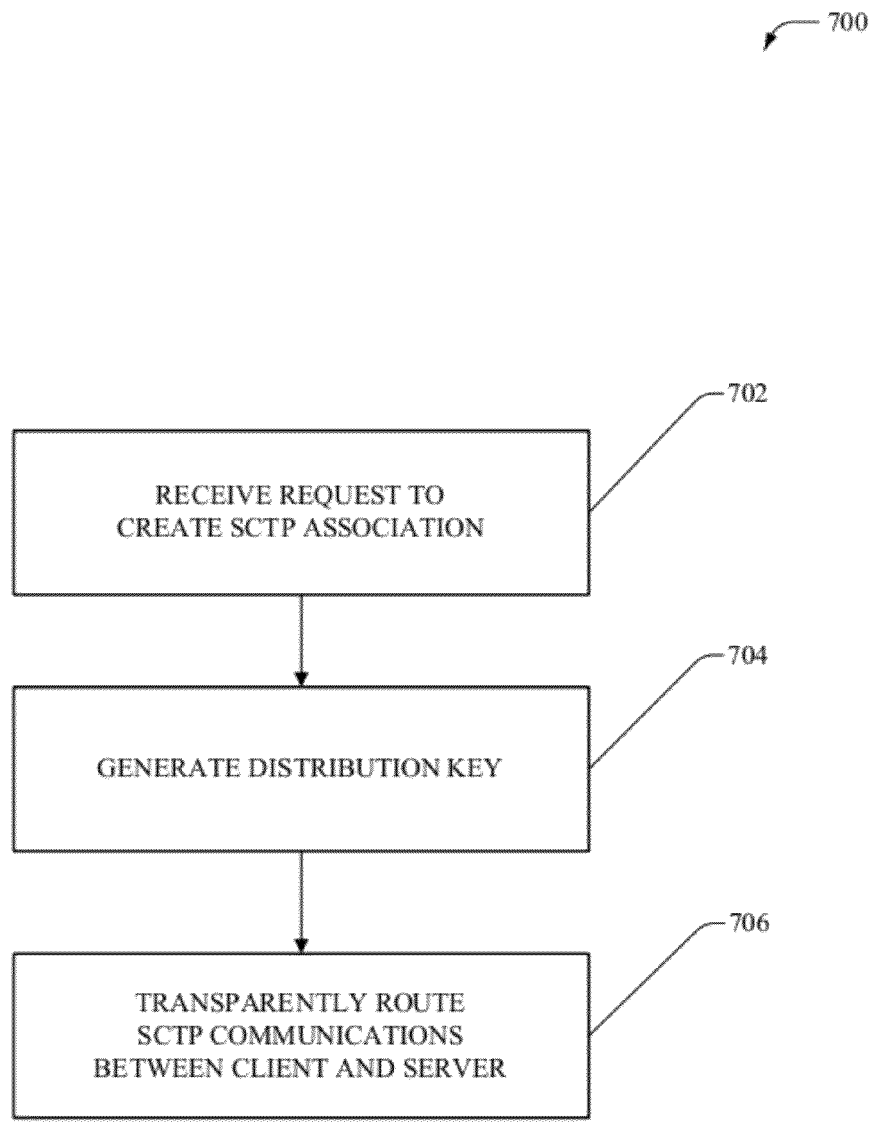
FIG. 7 a flowchart depicting a method for establishing an SCTP association between a client and one of a plurality of back-end servers through a load-balancing front-end server while preventing the possibility of clashing distribution based on SCTP verification tags generated by the back-end servers.

Continuing at FIG. 7, an exemplary method embodiment 700 for providing SCTP communication traffic distribution based on SCTP verification tags. Starting at step 702, the exemplary method embodiment 700 can receive a request to initiate an SCTP association between a client 102 and a back-end server 108. In the exemplary embodiment the initiation request can come from the client 102 or the back-end server. It should be noted in the exemplary embodiment that method 700 operates on a front-end server 106 that is transparent to both the client 102 and the back-end server 108. Further, it should be noted in the exemplary that there are a plurality of back-end servers 108 that operate independently of each other and are not aware of the existence of each other.

Continuing with the exemplary embodiment at step 704, the front-end server 106 can generate a distribution key for routing SCTP communication packets between the client 102 and the back-end server 108 based on SCTP parameters collected from the client and the back-end server 108. Continuing with the exemplary embodiment, the front-end server 106 can use the SCTP port number from the client 102, the SCTP port number from the back-end server 108 and the SCTP Verification-Tag from the back-end server to generate a distribution tag that for this SCTP association.

Further, at step 706 of the exemplary embodiment, the method 700 transparently routes SCTP packets between the client 102 and the back-end server 108. The exemplary method embodiment 700 retrieves the distribution key from the SCTP packet and extracts the SCTP Verification-Tag from the distribution key. The SCTP Verification-Tag represents the identity of the client 102 or back-end server 108 destination connected to the SCTP association for this SCTP communication. The exemplary method embodiment 700 then sends this SCTP packet towards the identified client 102 or back-end server 108.

Figure 8:
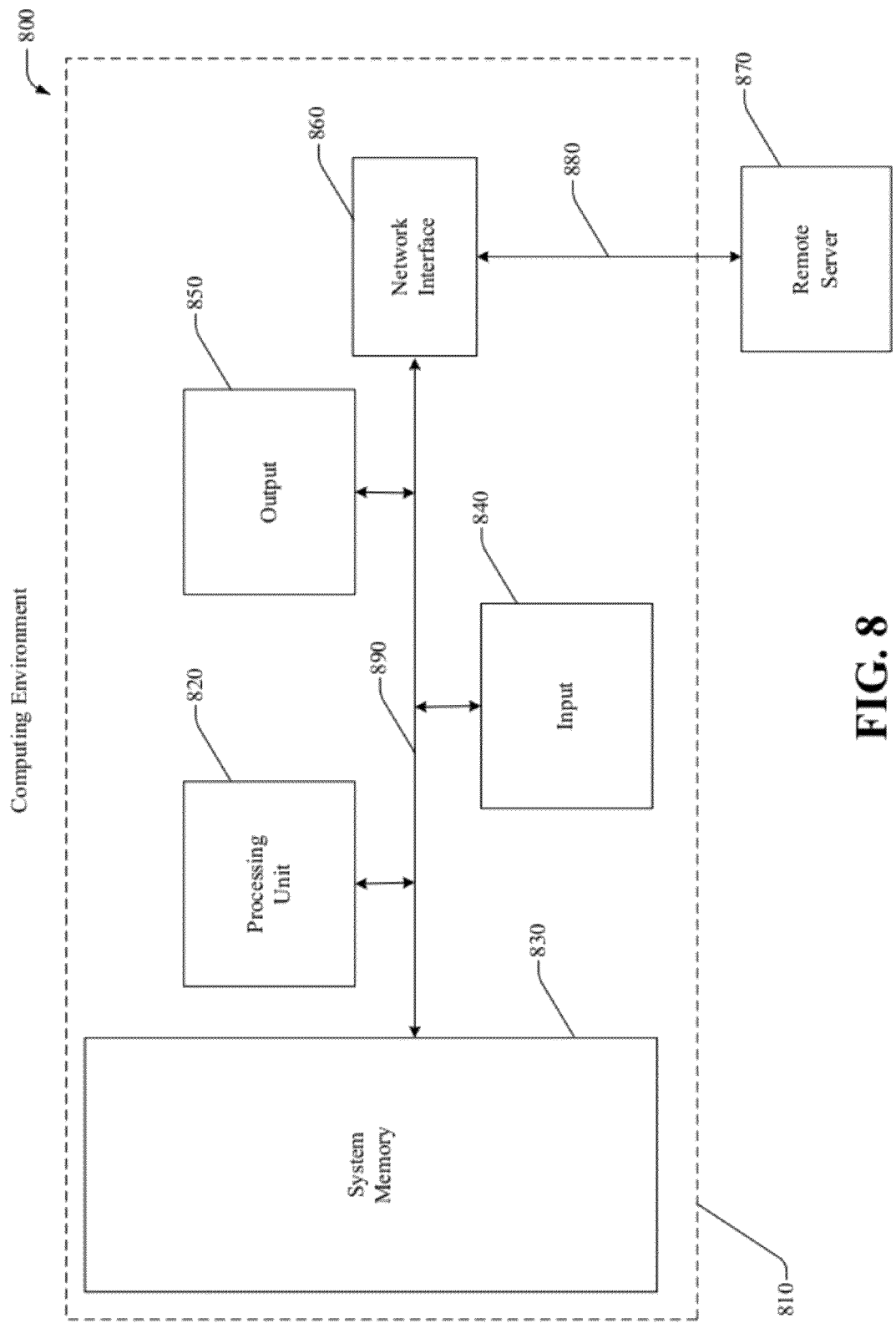
FIG. 8 depicts an exemplary computing device for implementing a system for a load-balancing front-end node to establish and route an SCTP connection between a client and a back-end serving node based on a back-end serving node generated SCTP verification tag

FIG. 8 illustrates an example of a suitable computing system environment 800 in which the claimed subject matter can be implemented, although as made clear above, the computing system environment 800 is only one example of a suitable computing environment for an exemplary embodiment and is not intended to suggest any limitation as to the scope of use or functionality of the claimed subject matter. Further, the computing environment 800 is not intended to suggest any dependency or requirement relating to the claimed subject matter and any one or combination of components illustrated in the example computing environment 800.

Looking now to FIG. 8, an example of a device for implementing the previously described innovation includes a general purpose computing device in the form of a computer 810. Components of computer 810 can include, but are not limited to, a processing unit 820, a system memory 830, and a system bus 890 that couples various system components including the system memory to the processing unit 820. The system bus 890 can be any of several types of bus structures including a memory bus or memory controller, a peripheral bus, and a local bus using any of a variety of bus architectures.

Computer 810 can include a variety of computer readable media. Computer readable media can be any available media that can be accessed by computer 810. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media can embody computer readable instructions, data structures, program modules or other data in a modulated data signal such as a carrier wave or other transport mechanism and can include any suitable information delivery media.

The system memory 830 can include computer storage media in the form of volatile and/or nonvolatile memory such as read only memory (ROM) and/or random access memory (RAM). A basic input/output system (BIOS), containing the basic routines that help to transfer information between elements within computer 810, such as during start-up, can be stored in memory 830. Memory 830 can also contain data and/or program modules that are immediately accessible to and/or presently being operated on by processing unit 820. By way of non-limiting example, memory 830 can also include an operating system, application programs, other program modules, and program data.

The computer 810 can also include other removable/non-removable and volatile/nonvolatile computer storage media. For example, computer 810 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 890 through a non-removable memory interface such as an interface, and a magnetic disk drive or optical disk drive can be connected to the system bus 890 by a removable memory interface, such as an interface.

A user can enter commands and information into the computer 810 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 820 through user input 840 and associated interface(s) that are coupled to the system bus 890, but can be connected by other interface and bus structures, such as a parallel port, game port or a universal serial bus (USB).

A graphics subsystem can also be connected to the system bus 890. In addition, a monitor or other type of display device can be connected to the system bus 890 through an interface, such as output interface 850, which can in turn communicate with video memory. In addition to a monitor, computers can also include other peripheral output devices, such as speakers and/or printing devices, which can also be connected through output interface 850.

The computer 810 can operate in a networked or distributed environment using logical connections to one or more other remote computers, such as remote server 870, which can in turn have media capabilities different from device 810. The remote server 870 can be a personal computer, a server, a router, a network PC, a peer device or other common network node, and/or any other remote media consumption or transmission device, and can include any or all of the elements described above relative to the computer 810. The logical connections depicted in FIG. 8 include a network 880, such as a local area network (LAN) or a wide area network (WAN), but can also include other networks/buses.

When used in a LAN networking environment, the computer 810 is connected to the LAN 880 through a network interface or adapter. When used in a WAN networking environment, the computer 810 can include a communications component, such as a modem, or other means for establishing communications over a WAN, such as the Internet. A communications component, such as a modem, which can be internal or external, can be connected to the system bus 890 through the user input interface at input 840 and/or other appropriate mechanism.

In a networked environment, program modules depicted relative to the computer 810, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device implementing a virtual keyboard. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

Further, the term to "infer" or "inference" refer generally to the process of reasoning about or inferring states of the system, environment, user, and/or intent from a set of observations captured from events and/or data. Captured events and data can include user data, device data, environment data, behavior data, application data, implicit and explicit data, etc. Inference can be employed to identify a specific context or action, or can generate a probability distribution over states, for example. The inference can be probabilistic in that the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A method, stored in a memory and executing on a processor, for distributing Stream Control Transmission Protocol (SCTP) packets between a client and one of a plurality of back-end servers, the method comprising:
routing by a front-end server said SCTP packets, each of which includes a distribution key created based on SCTP parameters associated with said client and said one of said plurality of back-end servers wherein said plurality of back-end servers share a virtual internet protocol (VIP) address with said front-end server;
wherein said distribution key comprises:
an SCTP port number provided by said client;
an SCTP port number provided by said one of said plurality of back-end servers; and
an SCTP Initiate-Tag provided by said one of said plurality of back-end servers; and
wherein said front-end server detects a clash between a first distribution key created for a first back-end server SCTP association and a second distribution key, while creating said second distribution key, for a second back-end server SCTP association and generates a replacement SCTP Initiate-Tag for said second distribution key to preserve the uniqueness of said first distribution key and said second distribution key.

2. The method of claim 1, wherein said distribution key is generated by said front-end server.

3. The method of claim 1, wherein said front-end server manages said replacement SCTP Initiate-Tag by maintaining a verification tag translation table to hold said replacement SCTP Initiate-Tag and said second distribution key as a matched pair.

4. The method of claim 1, wherein said front-end server updates a SCTP common header associated with said second distribution key based on said replacement SCTP Initiate-Tag and recalculating a checksum associated with said SCTP common header.

5. The method of claim 1, wherein said front-end server operates transparently with regard to said plurality of back-end servers.

6. The method of claim 1, wherein said plurality of back-end servers, sharing said VIP address, operate independently of each other and are not aware of the existence of each other.

7. The method of claim 1, wherein said method does not require Stream Control Transmission Protocol (SCTP) modifications.

8. The method of claim 1, wherein said method does not require Internet Protocol (IP) header modifications.

9. The method of claim 1, wherein said Initiate-Tag is configured to be the address of said one of said plurality of back-end servers.

10. A front end server for distributing Stream Control Transmission Protocol (SCTP) packets between a client and one of a plurality of back-end servers, comprising a processor and a memory, said memory containing instructions executable by said processor whereby said processor is operative to:
route said SCTP packets, each of which includes a distribution key created based on SCTP parameters associated with said client and said one of said plurality of back-end servers wherein said plurality of back-end servers share a virtual internet protocol (VIP) address with said front-end server;
wherein said distribution key comprises:
an SCTP port number provided by said client; an SCTP port number provided by said one of said plurality of back-end servers; and an SCTP Initiate-Tag provided by said one of said plurality of back-end servers; and
wherein said front-end server detects a clash between a first distribution key created for a first back-end server SCTP association and a second distribution key, while creating said second distribution key, for a second back-end server SCTP association and generates a replacement SCTP Initiate-Tag for said second distribution key to preserve the uniqueness of said first distribution key and said second distribution key.

11. The front end server of claim 10, wherein said distribution key is generated by said front-end server.

12. The front end server of claim 10, wherein said front-end server manages said replacement SCTP Initiate-Tag by maintaining a verification tag translation table to hold said replacement SCTP Initiate-Tag and said second distribution key as a matched pair.

13. The front end server of claim 10, wherein said front-end server updates a SCTP common header associated with said second distribution key based on said replacement SCTP Initiate-Tag and recalculating a checksum associated with said SCTP common header.

14. The front end server of claim 10, wherein said front-end server operates transparently with regard to said plurality of back-end servers.

15. The front end server of claim 10, wherein said plurality of back-end servers, sharing said VIP address, operate independently of each other and are not aware of the existence of each other.

16. The front end server of claim 10, wherein no Stream Control Transmission Protocol (SCTP) modifications are required.

17. The front end server of claim 10, wherein no Internet Protocol (IP) header modifications are required.

18. The front end server of claim 10, wherein said Initiate-Tag is configured to be the address of said one of said plurality of back-end servers.

* * * * *